United States Patent [19]
Hofmann et al.

[11] Patent Number: 5,525,109
[45] Date of Patent: Jun. 11, 1996

[54] TRIPODE JOINT WITH ROLLER SECURING RING

[75] Inventors: Norbert Hofmann, Ronneburg; Michael Ricks, Bad Vilbel; Volker Bergmann, Stockstadt, all of Germany

[73] Assignee: GKN Automotive AG, Lohmar, Germany

[21] Appl. No.: 306,702

[22] Filed: Sep. 15, 1994

[30] Foreign Application Priority Data

Sep. 16, 1993 [DE] Germany ............ 43 31 474.0

[51] Int. Cl.⁶ .................................. F16D 3/205
[52] U.S. Cl. ............ 464/111; 464/132; 464/905
[58] Field of Search ............ 464/111, 123, 464/124, 132, 905

[56] References Cited

U.S. PATENT DOCUMENTS

| | | | |
|---|---|---|---|
| 2,265,554 | 12/1941 | Thomas | 74/569 |
| 3,490,251 | 1/1970 | Roethlisberger | 464/124 |
| 5,167,583 | 12/1992 | Bensinger et al. | 464/905 X |
| 5,171,185 | 12/1992 | Schneider | 464/111 |
| 5,376,049 | 12/1994 | Welschof et al. | 464/111 |
| 5,380,249 | 1/1995 | Krude | 464/123 X |
| 5,391,013 | 2/1995 | Ricks et al. | 403/59 |

FOREIGN PATENT DOCUMENTS

| | | | |
|---|---|---|---|
| 0441382 | 8/1991 | European Pat. Off. | 464/111 |
| 1911305 | 12/1964 | Germany . | |
| 1283605 | 11/1968 | Germany . | |
| 4130183A1 | 3/1993 | Germany . | |
| 4130963A1 | 4/1993 | Germany . | |
| 9303304 | 8/1993 | Germany . | |

*Primary Examiner*—Daniel P. Stodola
*Assistant Examiner*—William A. Rivera
*Attorney, Agent, or Firm*—Harness, Dickey & Pierce

[57] ABSTRACT

A tripode joint with an outer joint part which comprises three circumferentially distributed axis-parallel recesses forming circumferentially opposed tracks, and an inner joint part whose cross-section is star-shaped and which is provided with three circumferentially distributed arms which engage the recesses of the outer joint part, with the arms supporting roller assemblies each comprising a roller carrier and a roller, which by way of a needle bearing, is rotatably supported on the roller carrier, with the rollers being arranged relative to the respective arms so as to be axially movable relative to the arm axis and angularly movable relative to the arm axis; and with reference to the roller axis (B), there is provided only one mutually effective axial securing element between each roller carrier and the respective roller in the form of only one single securing ring which may be subjected to loads in both directions and which engages radially opposed first and second annular grooves in the inner face in the roller on the one hand and in the outer face of the roller carrier on the other hand.

16 Claims, 3 Drawing Sheets

TRIPODE JOINT WITH ROLLER SECURING RING

The invention relates to a tripode joint with an outer joint part which comprises three circumferentially distributed axis-parallel recesses forming circumferentially opposed tracks, and an inner joint part whose cross-section is star-shaped and which is provided with three circumferentially distributed arms which engage the recesses of the outer joint part, with the arms supporting roller assemblies each comprising a roller carrier and a roller, which by means of a needle bearing, is rotatably supported on the roller carrier, with the rollers being arranged relative to the respective arms so as to be axially movable relative to the arm axis and angularly movable relative to the arm axis. Several embodiments of tripode joints of this type are known from DE 41 30 183.8.

These different assemblies have one feature in common in that, for axially securing the rollers on the roller carrier relative to the roller axis, they either comprise a securing ring on each side or a securing ring on one side, combined with a collar provided on one side of the roller carrier. Any securing rings axially subjected to loads on one side are provided with supporting discs.

The securing means used so far between the roller carrier and roller consist of a plurality of parts and require a great deal of axial space which is lost for the bearing face. If a one-piece collar is provided on one side of the roller carrier, the machining operation which needs to be carried out on the cylindrical outer face constituting the bearing face becomes more complicated and more expensive. When the roller rotates on the roller carrier, a considerable amount of friction occurs in the region of the securing means.

It is therefore the object of the invention to further develop a tripode joint of the said type in such a way that the roller assembly is improved in respect of the friction conditions, utilization of space and roller guidance in the outer joint part while at the same time reducing production cost.

The objective is achieved in that, with reference to the roller axis, there is provided only one mutually effective axial securing element between each roller carrier and the respective roller in the form of only one single securing ring which may be subjected to loads in both directions and which engages radially opposed first and second annular grooves in the inner face of the roller on the one hand and in the outer face of the roller carrier on the other hand.

This roller assembly is advantageous in that it has been possible to reduce the securing means which now consist in one securing ring which may be subjected to axial loads on two sides. The production of the roller carrier and roller is thus simplified no a considerable extent. It is now only necessary to provide first and second annular grooves for the securing ring and one recess for the needle bearing.

Furthermore, there is no longer any need for further profiling the inner face of the roller or the outer face of the roller carrier.

The radially opposed faces of the roller assembly parts, i.e. the outer face of the roller carrier and the inner face of the roller may largely be formed as cylindrical faces, which greatly simplifies mass production. By reducing the number of machining operations and eliminating the need for additional securing parts, it is possible to achieve considerable cost savings.

By reducing the securing means while leaving the size of the bearing face for the needle bearing unchanged, it is possible to reduce the axial length of the roller assembly. As a result, the supporting faces for the rollers positioned at the radially inner edges of the tracks in the outer joint part with reference to the joint axis may be displaced radially outwardly by a certain amount. In consequence, it is possible to increase the inner diameter of the outer joint part, thereby increasing the angle/travel capacity of the joint, i.e. with an unchanged outer diameter and a predetermined plunging distance, the angle of articulation of the joint may be increased.

At the same time, the free space obtained by reducing the securing means allows the supporting faces for the rollers at the radially inner edges of the tracks to be designed differently.

According to a preferred embodiment, a roller, on its radial outside and inside with reference to the joint axis comprises end or annular faces which are in contact with supporting faces along the tracks in the recesses in the outer joint part. The inner and outer supporting faces may extend parallel relative to one another and perpendicularly relative to the roller axis. By arranging the supporting faces parallel relative to one another and by supporting the roller assembly on a large diameter, it is possible to reduce the friction forces and thus the joint excitation forces.

In consequence, the guiding conditions for the rollers in the recesses in the outer joint part are qualitatively improved because the rollers are guided on a roller face whose diameter is greater Than the diameter of the outer end face of the roller carrier, as a result of which the supporting lengths of The rollers are increased.

According to a further possible embodiment it is proposed that a roller carrier, on its radial outside with reference to the joint axis comprises an end face which is in supporting contact with the head face of the recess and that a roller carrier or a roller, on its radial inside with reference to the joint axis comprises an annular face which is in supporting contact with portions of the tracks in the recesses in the outer joint part. In this case, the rollers are guided on the outer end face of a roller carrier relative to the head face in a recess on a smaller diameter, but in an advantageous way they are guided by a non-rotating part.

In a particularly advantageous embodiment, the securing ring is accommodated in an annular groove which is provided either in the outer face of the roller carrier or in the inner face of the roller, with the respective face being cylindrical along the entire height.

In a further embodiment, a recess for receiving the needle bearing is provided either in the inner face of a roller or on the outer face of a roller carrier, with especially the bearing face of the respective other roller assembly parc being cylindrical except the annular groove, thereby simplifying the production of said part considerably.

According to a special embodiment, it is proposed that the recess for accommodating the needle bearing in one of the faces of a roller or of a roller carrier extends cylindrically as far as one end where it is secured by a further axial securing ring which merely engages one annular groove in the recess which is open at one end. In this case, assembly is simplified considerably in that the individual roller assembly parts may be joined independently of one another and that the needle bearing may be inserted after the roller and roller carrier have been assembled, which is advantageous especially when bearing cages are used.

A further possible embodiment is characterized by a recess for receiving the needle bearing, which recess runs out cylindrically at one end of a roller bearing or of a roller, with the needle bearing and the roller, on one side, being held by only one securing ring. This embodiment requires a few parts only, and in view of the fact that the needle bearing and roller are secured on the roller carrier by one single securing ring, the assembly can be produced without requiring a great deal of expenditure, and the individual roller assembly parts can nevertheless be assembled independently of one another. In this case, the securing ring is preferably provided with a gap whose cutting direction extends at an angle relative to the radial ray intersecting the gap and the centre of the securing ring, with the width of the gap not exceeding 60% of the diameter of the bearing needle.

The advantage in this case refers to the shape and width of the gap of the securing ring, which prevent the needles of the needle bearing from being pushed out of the roller assembly.

Preferred embodiments of the invention are illustrated in the drawing wherein

Figure 1A:
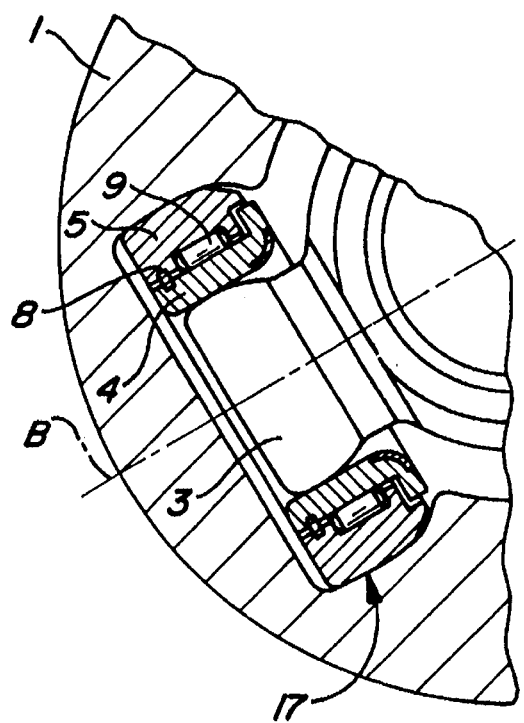
FIG. 1a shows a first embodiment of a tripode joint with roller assemblies illustrated in partial cross-section relative to the joint axis A.

FIG. 1a shows a tripode joint consisting of an outer joint part 1 and an inner joint part 2, with the latter comprising arms 3, 3' which are arranged star-like and radially relative to the joint axis A and which each support a roller assembly 17, 17'. The roller assemblies 17, 17' primarily consist of a roller carrier 4, 4' and a roller 5, 5' running on the arm 3, 3'.

The embodiment of a roller assembly shown in the top half in section and on the bottom righthand side in the form of a plan view is guided on an entirely cylindrical arm 3', with the roller carrier 4' being provided in two parts and comprising an inner ring 6 having a cylindrical through-bore and a spherical outer face and, in the actual sense of the word, engaging a calotte-shaped face of the roller carrier 4'. On the other hand, the roller assembly embodiment shown in the form of a cross-section in FIG. 1b is held on a spherical arm 3 which engages an internally cylindrical inner aperture of the one-piece roller carrier 4.

The rollers 5, 5' are each supported by needle bearings 9, 9' on the roller carriers 4, 4', with the needle bearings 9, 9' each engaging a recess 14. A securing ring 8, 8' secures the rollers 5, 5' on the roller carriers 4, 4' in both directions relative to the roller axis B. The securing rings 8, 8' each engage an annular groove 10 in the roller carriers 4, 4' and an annular groove 15 in the rollers 5, 5'.

In the case of the embodiment shown in FIG. 1a, the roller carrier 4', by means of an outer end face and an inner shoulder face, is supported in the recess 16 of the outer joint part, and relative thereto, the roller 5', as mentioned above, is radially supported entirely by the securing ring 8', with reference to the joint axis A.

Figure 1B:
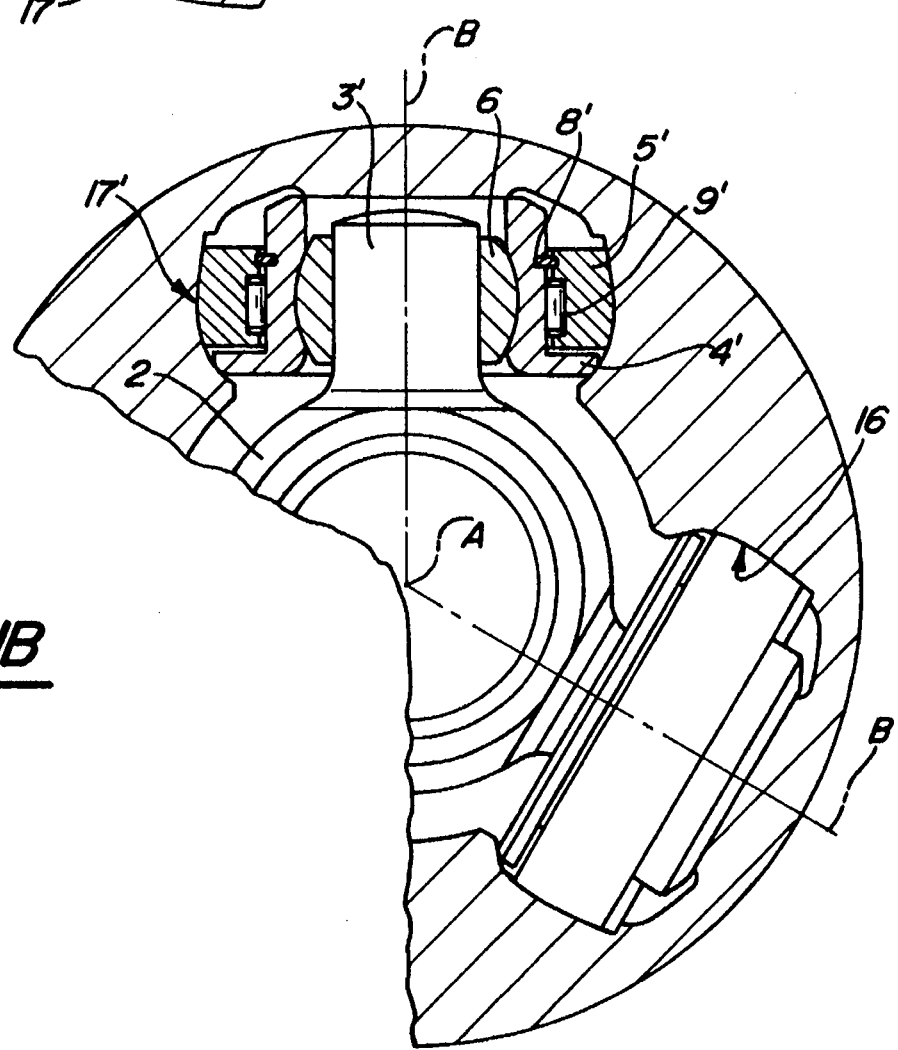
FIG. 1b shows a partial sectional view of a second embodiment of a tripode joint with roller assemblies.

In the case of the embodiment illustrated in FIG. 1b, the roller 5 is directly supported in the tracks of the recess 16, whereas the roller carrier 4 does not contact the recess, but is radially supported on the roller entirely by means of the securing ring 8, in each case with reference to the joint axis A.

FIG. 2, any details identical to those shown in FIG. 1 have been given the same reference numbers, but accompanied by different indices. To than extent, reference is made to the description above.

Figure 2A:
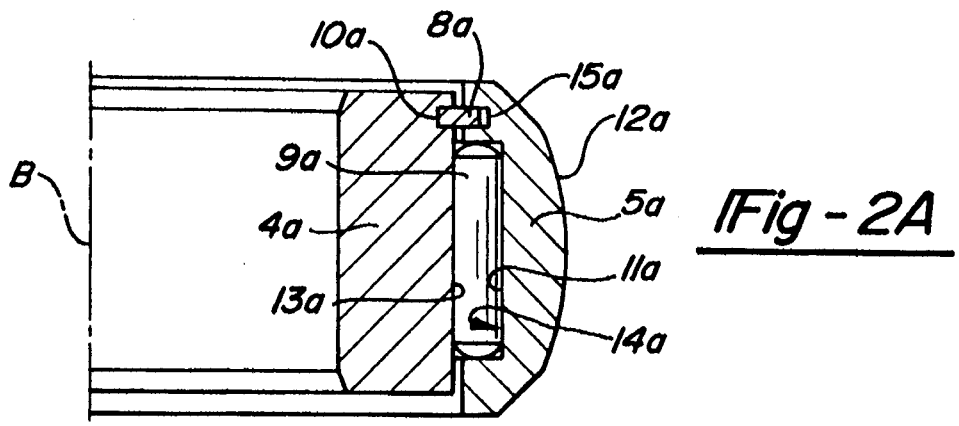
FIG. 2a shows a roller assembly with a recess for accommodating the needle bearing in the inner face of the roller, and a securing ring.

FIG. 2a shows a roller assembly having a roller carrier 4a and a roller 5a comprising a recess 14a for accommodating a needle bearing 9a on the inner face 11a of the roller 5a. In both directions relative to the roller axis B, the roller 5a is secured by a securing ring 8a engaging annular grooves 10a, 15a in the outer face 13a of the roller carrier 4a and in the inner face 11a of the roller 5a.

Figure 2B:
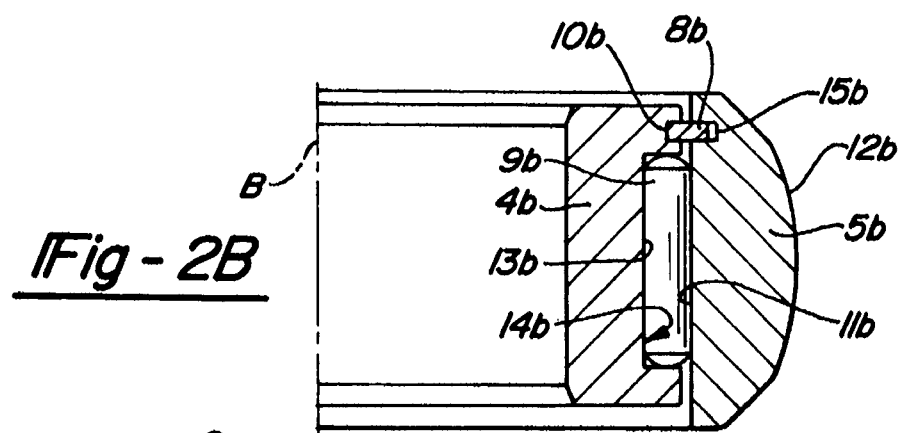
FIG. 2b shows a roller assembly with a recess for accommodating the needle bearing in the outer face of the roller carrier, comprising a securing ring.

FIG. 2b shows a roller assembly in the case of which a recess 14b for receiving a needle bearing 9b is arranged in the outer face 13b of the roller carrier 4b and where again a roller 5b is held on the roller carrier 4b in both directions relative to the roller axis B by axial securing means comprising a securing ring 8b which engages annular grooves 10b, 15b.

Figure 2C:
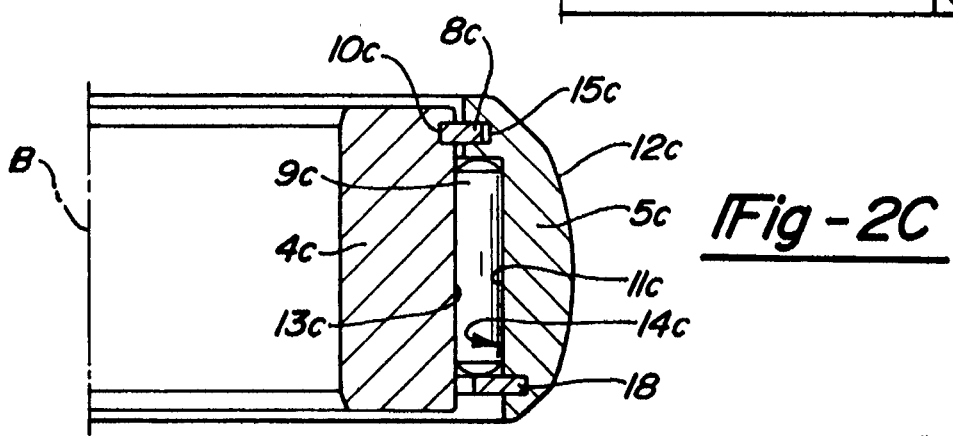
FIG. 2c shows a roller assembly according to FIG. 2a, comprising a recess in the inner face of the roller, which recess, towards one side, runs out cylindrically as far as one end of the roller, with a further securing ring in the recess securing the needles.

FIG. 2c shows a roller assembly according to FIG. 2a, in the case of which a recess 14c for accommodating a needle bearing 9c extends as far as an end face of a roller 5c and where a needle bearing 9c is held by a further securing ring 8c, with the securing ring 8c engaging a further annular groove 15c in the inner face 11c of the roller 5c.

Figure 2D:
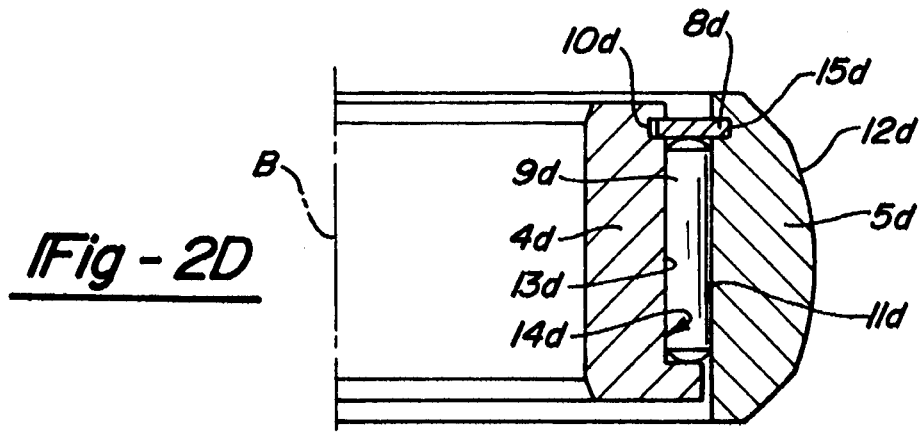
FIG. 2d shows a roller assembly according to FIG. 2b, comprising a recess in the outer face of the roller carrier, which recess, towards one end, runs out cylindrically as far as the end of the roller carrier, with a securing ring securing the needles and also axially securing the rollers.

FIG. 2d shows a roller assembly similar to that shown in FIG. 2b, with the recess 14d for accommodating a needle bearing 9d extending as far as an end face of a roller 5d. The needle bearing 9d is held by a securing ring 8d in accordance with the invention, which ring engages annular grooves 10d, 15d and at the same time secures the roller 5d on the roller carrier 4d in both directions relative to the roller axis.

Figure 3:
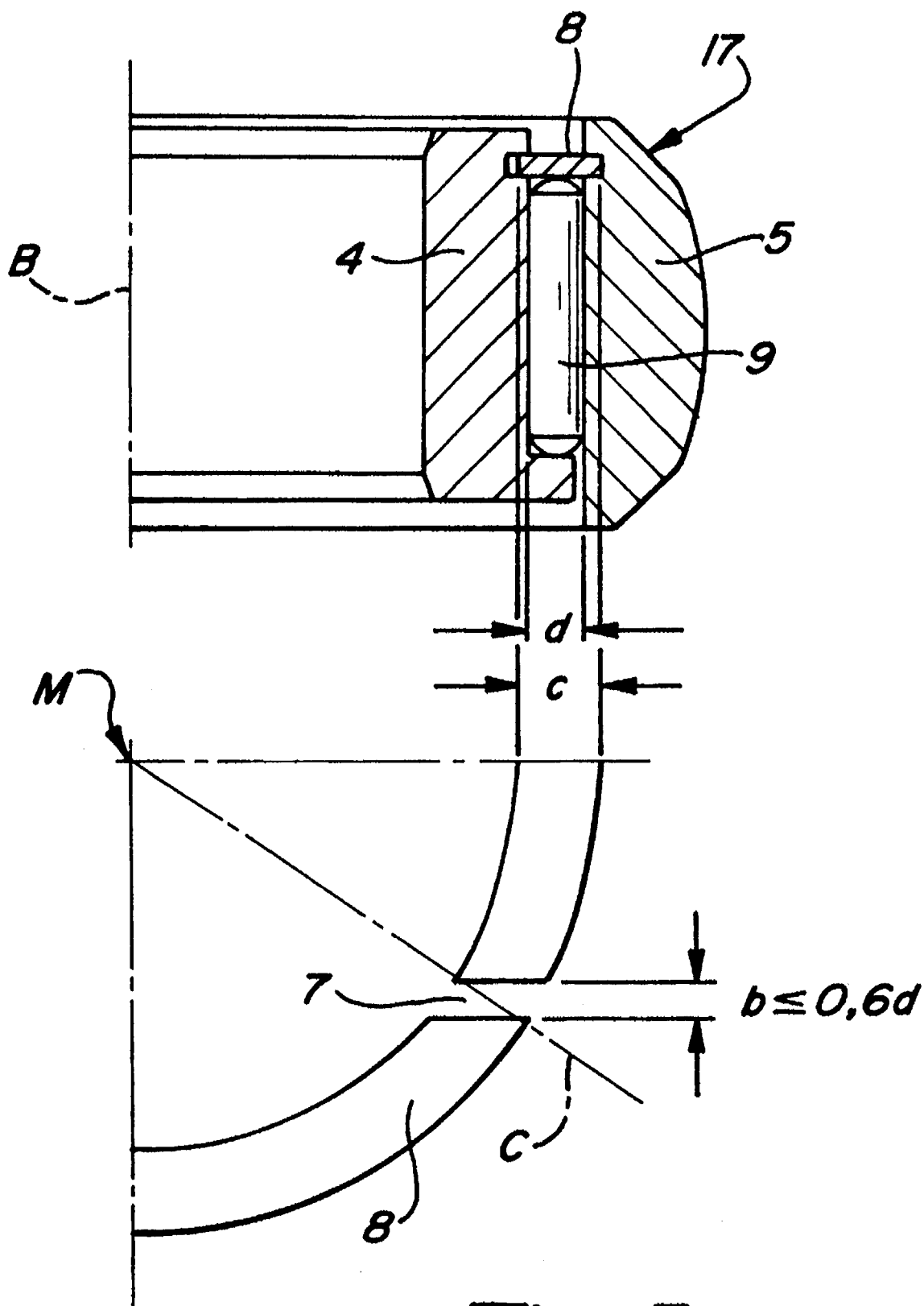
FIG. 3 shows a roller assembly according to FIG. 2d in the form of half a section, comprising a securing ring which may be subjected to loads on two sides and also showing the gap of the securing ring in a plan view.

FIG. 3 shows the roller assembly according to FIG. 2d, with one quarter of the securing ring 8 being shown in a plan view and also indicating the centre M; it also shows a gap 7 which is required for assembly purposes and which extends at an angle relative to a radial ray C through the roller axis. The width b of the gap should be smaller than/equal to 0.6 times the diameter d of a bearing needle, whereas, for functional reasons, the width c of the securing ring 8 is greater than the diameter d of a bearing needle.

We claim:

1. A tripode joint comprising an outer joint part with three circumferentially distributed axis-parallel recesses forming circumferentially opposed tracks;

an inner joint part including three circumferentially distributed arms which engage the recesses of the outer joint part;

roller assemblies are supported on each arm, each roller assembly including a roller carrier and a roller which, by means of a needle bearing, is rotatably supported on the roller carrier, with the rollers being arranged relative to the respective arm so as to be axially movable relative to the arm axis and angularly movable relative to the arm axis, one mutually effective axial securing element is provided between each roller carrier and the respective roller in the form of only one single securing ring which is adapted to take mutual loads in both senses of axial direction, said ring engages radially opposed first and second annular grooves in the roller, on the one hand, and in the roller carrier, on the other hand.

2. A tripode joint according to claim 1, wherein each roller, radially outside and inside, with reference to a joint axis, includes end faces which are in supporting contact with portions of the tracks in the recesses in the outer joint part.

3. A tripode joint according to claim 1, wherein each roller carrier, radially outside, with reference to a joint axis, includes an end face which is in supporting contact with a head face of the recess and that each roller carrier, radially inside, with reference to the joint axis, includes an annular face which is in supporting contact with portions of the tracks in the recesses in the outer joint part.

4. A tripode joint according to claim 1, wherein the roller carrier, relative to the roller axis, includes only the one of the said first and second annular grooves and is otherwise cylindrical along its entire height.

5. A tripode joint according to claim 1, wherein for receiving the needle bearing, a recess is provided in the roller relative to a roller axis.

6. A tripode joint according to claim 5, wherein the recess for accommodating the needle bearing and another one of the said annular grooves are provided in the roller, which roller is otherwise cylindrical along its entire height.

7. A tripode joint according to claim 5, wherein the recess for accommodating the needle bearing and another one of said annular grooves are provided in the roller carrier, which roller carrier is otherwise cylindrical along its entire length.

8. A tripode joint according to claim 5, wherein the recess for accommodating the needle bearing in the roller relative to a roller axis runs out cylindrically as far as one end of the roller or the roller carrier and that the needle bearing is held by a head face of the recess and a further axial securing ring engaging an annular groove in the recess which is axially open at one end.

9. A tripode joint according to claim 5, wherein the recess for accommodating the needle bearing in the roller carrier relative to a roller axis runs out cylindrically as far as one end of the roller carrier or the roller and that the needle bearing is held by a head face of the recess and by said securing ring whose one annular groove is formed in the recess.

10. A tripode joint according to claim 9, wherein the securing ring includes a gap whose width is smaller than sixty (60%) percent of the diameter of a needle of the needle bearing and whose direction extends preferably at an angle relative to a radial ray from a roller axis through the gap.

11. A tripode joint according to claim 5, wherein the recess for accommodating the needle bearing in the roller carrier relative to the roller axis runs out cylindrically as far as one end of the roller or the roller carrier and that the needle bearing is held by a head face of the recess and a further axial securing ring engaging an annular groove in the recess which is axially open at one end.

12. A tripode joint according to claim 5, wherein the recess for accommodating the needle bearing in the roller relative to the roller axis runs out cylindrically as far as one end of the roller carrier or the roller and that the needle bearing is held by a head face of the recess and by said securing ring whose one annular groove is formed in the recess.

13. A tripode joint according to claim 1, wherein each roller, radially outside and inside, with reference to a joint axis, includes annular faces which are in supporting contact with portions of the tracks in the recesses in the outer joint part.

14. A tripode joint according to claim 1, wherein each roller carrier, radially outside, with reference to a joint axis, includes an end face which is in supporting contact with a head face of the recess and that each roller, radially inside, with reference to the joint axis, includes an annular face which is in supporting contact with portions of the tracks in the recesses in the outer joint part.

15. A tripode joint according to claim 1, wherein the roller, relative to the roller axis, includes only the one of the said first and second annular grooves and is otherwise cylindrical along its entire height.

16. A tripode joint according to claim 1, wherein for receiving the needle bearing, a recess is provided in the roller carrier relative to a roller axis.

* * * * *

UNITED STATES PATENT AND TRADEMARK OFFICE
CERTIFICATE OF CORRECTION

PATENT NO. : 5,525,109
DATED : June 11, 1996
INVENTOR(S) : Norbert Hofmann, Michael Ricks, Volker Bergmann It is certified that error appears in the above-indentified patent and that said Letters Patent is hereby corrected as shown below:

Column 1, line 49, "no" should be --to--

Column 2, line 24, "Than" should be --than--

Column 2, line 26, "The" should be --the--

Column 2, line 46, "pare" should be --part--.

Column 3, line 38, delete "FIG. 1a shows a tripode joint" and insert --FIGS. 1a and 1b show tripode joints--

Column 3, line 52, "FIG. 1b" should be --FIG. 1a--

Column 3, line 62, "FIG. 1a" should be --FIG. 1b--

Column 4, line 1, "FIG. 1b" should be --FIG. 1a--

Column 4, line 7, before "FIG. 2" insert --In--

Column 4, line 9, "than" should be --that--

Signed and Sealed this

Third Day of December, 1996

*Attest:*

BRUCE LEHMAN

*Attesting Officer*   *Commissioner of Patents and Trademarks*